Patented Aug. 17, 1943

2,327,191

UNITED STATES PATENT OFFICE 2,327,191

PRODUCTION OF FUMARIC ACID

Jasper H. Kane, Brooklyn, Alexander Finlay, Sea Cliff, and Philip F. Amann, Brooklyn, N. Y., assignors, by direct and mesne assignments, of one-half to Chas. Pfizer & Co., Inc., a corporation of New Jersey, and one-half to Merck & Co. Inc., Rahway, N. J., a corporation of New Jersey No Drawing. Application December 7, 1939, Serial No. 308,014

14 Claims. (Cl. 195—36)

This invention relates to the production of fumaric acid and salts of fumaric acid by fungi or molds.

While it has been known for many years that certain fungi, such as *Rhizopus nigricans* (*Mucor stolonifer*) and some Aspergilli are able to form fumaric acid, none of the processes has been commercially practicable. In most instances, investigators grew the mold on the surface of a shallow layer of medium (sometimes referred to as "quiet surface fermentation"), a procedure which would present serious difficulties in the case of large scale production. Kanel (Microbiology U. S. S. R. 4: 636, 1935) tried to produce fumaric acid by introducing into a nutrient-free medium a mold mycelium that had been pre-grown at low temperatures, and keeping the liquor in motion during fermentation. By this procedure he was not able to produce even traces of fumaric acid in the presence of air.

By means of our process we obtain substantial yields of fumaric acid or, in the presence of a suitable neutralizing agent, a salt of this acid, with only traces of other acids, thereby permitting the ready recovery of high-grade fumaric acid in an economical manner.

We have found that in the presence of nutrient salts, the desired aerobic type of fermentation using the submerged growth of a selected mold can be brought about either by suitable mechanical agitation or by passing a stream of air through the medium, or both. Instead of air, a mixture of suitable oxygen-containing gases can be used. For example, a mixture of oxygen and carbon dioxide gives good results. The fermentation may be conducted either at atmospheric or higher pressures, and within the normal temperature range for the organism used. The amount of inoculum and the amount and selection of nutrient salts may be varied within a considerable range; solutions of potassium acid phosphate and ammonium sulfate are suitable as nutrients, but other commonly used nutrients for fungi may be used. The temperature is preferably maintained above 18° C.

A further advantage of this process is that a suitable neutralizing agent, such as calcium carbonate or calcium hydroxide, may be added as the fermentation progresses without interfering with the growth and activity of the mold, thereby making it possible to control the acidity of the medium.

As raw materials, a variety of carbohydrate substances may be used. By carbohydrate, we refer to a class of neutral compounds belonging to the groups of sugars, starches and their derivatives; more specifically, glucose, fructose, sucrose, invert sugar, maltose, molasses and syrups, the various starches, grains, malted grains, cereal products and other materials containing any of the above substances. The most satisfactory fungi for this fermentation are found among the genera known as Mucor, Aspergillus and Rhizopus. Certain strains of these groups are preferably conditioned in the known manner before introducing into the fermentation system.

*Example 1.*—2.7 liters of a 10% invert sugar solution plus 180 grams calcium carbonate (and small amounts of nutrient salts) were sterilized under steam pressure and introduced into a rotary drum-type fermenter. After inoculating with 50 cc. of a selected *Rhizopus nigricans* culture, the drum was started rotating at approximately 15 R. P. M., while being maintained at 30° C. and under a pressure of two atmospheres; at the same time a current of air was kept passing through the fermenter. At the end of four days, the fermentation was stopped and the solution was analyzed. 143 grams of fumaric acid and 24 grams of invert sugar were found.

*Example 2.*—Two liters of a 10% invert sugar solution, to which was added 70 grams calcium carbonate and nutrient salts, were inoculated with 50 cc. of a selected *Rhizopus nigricans* culture, and suitably aerated by stirring at 1800 R. P. M. while kept at approximately 30° C. At the end of three days, the fermentation was stopped and the liquor was analyzed. 70 grams fumaric acid and 44 grams invert sugar were found.

*Example 3.*—131 grams corn starch, 100 grams calcium carbonate plus nutrient salts were diluted to 2 liters, sterilized, cooled and inoculated with 25 cc. of a selected mold culture. After aerating by means of a suitable stirrer for four days, the fermentation was stopped and the liquor analyzed. 33.6 grams fumaric acid were found.

*Example 4.*—30.25 lbs. hydrated glucose and small amounts of nutrient salts were diluted to 50 gals. 20 lbs. calcium carbonate were added. The charge was sterilized by boiling, cooled, and inoculated with 3 liters selected *Rhizopus nigricans* culture. While maintained at 28–32° C., the charge was stirred at 40 R. P. M., and at the same time a stream of air was passed through the liquor. After three days, the fermentation was stopped and the liquor was analyzed. Twelve and one-half pounds of fumaric acid were found.

We claim:

1. A process for the production of a member selected from the group consisting of fumaric acid and its salts, comprising the fermentation of a sugar solution containing nutrient salts by means of a submerged growth of a fumaric acid-producing mold selected from the group of genera consisting of Mucor, Aspergillus and Rhizopus.

2. A process for the production of a member selected from the group consisting of fumaric acid and its salts, comprising the fermentation of an aqueous carbohydrate substrate containing nutrient salts by means of a submerged aerobic growth of a fumaric acid-producing mold selected from the group of genera consisting of Mucor, Aspergillus and Rhizopus.

3. A process for the production of a member selected from the group consisting of fumaric acid and its salts, comprising the aerobic fermentation of a nutrient-containing carbohydrate substrate by means of a submerged growth of a fumaric acid-producing mold selected from the group of genera consisting of Mucor, Aspergillus and Rhizopus in the presence within the liquid of an oxygen-containing gas.

4. A process for the production of salts of fumaric acid comprising the fermentation of a nutrient-containing carbohydrate substrate by means of a submerged aerobic growth of a fumaric acid-producing mold selected from the group of genera consisting of Mucor, Aspergillus and Rhizopus in the presence of a neutralizing agent.

5. A process for the production of a member selected from the group consisting of fumaric acid and its salts, comprising the fermentation of carbohydrate solutions containing nutrient salts by means of a submerged growth of a fumaric acid-producing *Rhizopus nigricans* strain.

6. A process for the production of a member selected from the group consisting of fumaric acid and its salts, comprising the fermentation of a nutrient-containing carbohydrate substrate which after inoculation with a fumaric acid-producing strain of *Rhizopus nigricans* is mechanically agitated while a stream of air is bubbled through the liquid at such a rate as to maintain a substantial excess of oxygen, thus promoting an increased rate of aerobic growth and fermentation.

7. A process for the production of a member selected from the group consisting of fumaric acid and its salts which consists in inoculating a member selected from the group consisting of starch, glucose and invert sugar, with the addition of nutrient salts and a neutralizing agent, with a fumaric acid-producing culture of a mold belonging to one of the group of genera consisting of Mucor, Aspergillus and Rhizopus and then agitating the solution so as to permit submerged aerobic mold growth and fermentation.

8. A process for the production of a member selected from the group consisting of fumaric acid and its salts, which consists of inoculating a member selected from the group consisting of starch, glucose, and invert sugar, with the addition of nutrient salts and a neutralizing agent, with a fumaric acid-producing strain of *Rhizopus nigricans*, then agitating the solution so as to permit submerged aerobic mold growth and fermentation.

9. A process for the production of a member selected from the group consisting of fumaric acid and its salts, which consists of inoculating a medium containing a suitable carbohydrate and nutrient salts with a fumaric acid-producing culture of a mold belonging to one of the group of genera consisting of Mucor, Aspergillus and Rhizopus, then agitating the medium so as to permit submerged, aerobic mold growth and fermentation, and adding a suitable neutralizing agent during the course of the fermentation to control the acidity.

10. A process for the production of a member selected from the group consisting of fumaric acid and its salts which consists of inoculating a medium containing a suitable carbohydrate and nutrient salts, with a fumaric acid-producing culture of a mold belonging to one of the group of genera consisting of Mucor, Aspergillus and Rhizopus, then agitating the medium under an air pressure greater than atmospheric so as to promote the desired submerged mold growth and fermentation in the presence of a neutralizing agent.

11. A process for the production of a member selected from the group consisting of fumaric acid and its salts, which consists of inoculating a medium containing a suitable carbohydrate, a neutralizing agent and nutrient salts, with a fumaric acid-producing culture of a mold belonging to one of the group of genera consisting of Mucor, Aspergillus and Rhizopus, then aerating and agitating the medium in the presence of oxygen to promote submerged mold growth and fermentation.

12. A process for the production of a member selected from the group consisting of fumaric acid and its salts, comprising the fermentation of a carbohydrate substrate containing nutrient salts which, after inoculation with a fumaric acid-producing strain of *Rhizopus nigricans*, is agitated in such a manner as to permit aerobic submerged growth of the mold.

13. A process for the production of a member selected from the group consisting of fumaric acid and its salts, comprising the fermentation of an aqueous carbohydrate substrate containing nutrient salts by means of a submerged aerobic growth of a fumaric acid producing strain of *Rhizopus nigricans*.

14. A process for the production of a member selected from the group consisting of fumaric acid and its salts which consists in inoculating a medium containing a carbohydrate and nutrient salts with a fumaric acid producing strain of *Rhizopus nigricans*, then agitating the medium so as to permit submerged, aerobic mold growth and fermentation, and adding a neutralizing agent during the course of the fermentation to control acidity.

JASPER H. KANE.
ALEXANDER FINLAY.
PHILIP F. AMANN.